(12) United States Patent
Chen et al.

(10) Patent No.: US 7,739,114 B1
(45) Date of Patent: Jun. 15, 2010

(54) METHODS AND APPARATUS FOR TRACKING SPEAKERS IN AN AUDIO STREAM

(75) Inventors: Scott Shaobing Chen, Bronx, NY (US); Alain Charles Louis Tritschler, New York, NY (US); Mahesh Viswanathan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 669 days.

(21) Appl. No.: 09/345,238

(22) Filed: Jun. 30, 1999

(51) Int. Cl.
*G10L 21/00* (2006.01)
(52) U.S. Cl. .................. 704/270; 704/270.1; 704/272
(58) Field of Classification Search ............. 704/215, 704/251, 270, 270.1, 272; 379/88.02
See application file for complete search history.

(56) References Cited

U.S. PATENT DOCUMENTS

| | | | |
|---|---|---|---|
| 5,659,662 A | | 8/1997 | Wilcox et al. |
| 5,897,616 A * | | 4/1999 | Kanevsky et al. ........ 379/88.02 |
| 5,930,748 A * | | 7/1999 | Kleider et al. ............. 704/219 |
| 6,345,252 B1 * | | 2/2002 | Beigi et al. ................ 704/251 |
| 6,345,253 B1 * | | 2/2002 | Viswanathan ............. 704/251 |
| 6,421,645 B1 * | | 7/2002 | Beigi et al. ................ 704/251 |
| 6,424,946 B1 * | | 7/2002 | Tritschler et al. .......... 704/251 |

FOREIGN PATENT DOCUMENTS

| | | |
|---|---|---|
| JP | 07-287969 | 10/1995 |
| JP | 2000-298498 | 10/2000 |

OTHER PUBLICATIONS

Scott Shaobing Chen et al. "speaker, Environment and Channel Change Detection and Cluster via the Bayesian Information Criterion," proceedings of the DARPA broadcast news transcription and understanding workshop, Lansdowne, VA, Feb. 8-11, 1998.*
Scott Shaobing Chen et al. "clustering via the Bayesian information criterion with applications in speech recognition," Acoustics,Speech and Signal Processing, 1998, proceed 1998 IEEE international Conference on p. 645-648 vol. 2, May 12-15, 1998.*
S. Dharanipragada et al., "Experimental Results in Audio Indexing," Proc. ARPA SLT Workshop, (Feb. 1996).
L. Polymenakos et al., "Transcription of Broadcast News—Some Recent Improvements to IBM's LVCSR System," Proc. ARPA SLT Workshop, (Feb. 1996).

(Continued)

*Primary Examiner*—Qi Han
(74) *Attorney, Agent, or Firm*—Ryan, Mason & Lewis, LLP

(57) ABSTRACT

Speakers are automatically identified in an audio (or video) source. The audio information is processed to identify potential segment boundaries. Homogeneous segments are clustered substantially concurrently with the segmentation routine, and a cluster identifier is assigned to each identified segment. A segmentation subroutine identifies potential segment boundaries using the BIC model selection criterion. A clustering subroutine uses a BIC model selection criterion to assign a cluster identifier to each of the identified segments. If the difference of BIC values for each model is positive, the two clusters are merged.

35 Claims, 3 Drawing Sheets

OTHER PUBLICATIONS

R. Baksi, "Transcription of Broadcast News Shows with the IBM Large Vocabulary Speech Recognition System," Proc. ICASSP98, Seattle, WA (1998).

H. Beigi et al., "A Distance Measure Between Collections of Distributions and its Application to Speaker Recognition," Proc. ICASSP98, Seattle, WA (1998).

S. Chen, "Speaker, Environment and Channel Change Detection and Clustering via the Bayesian Information Criterion," Proceedings of the Speech Recognition Workshop (1998).

S. Chen et al., "Clustering via the Bayesian Information Criterion with Applications in Speech Recognition," Proc. ICASSP98, Seattle, WA (1998).

S, Chen et al., "IBM's LVCSR System for Transcription of Broadcast News Used in the 1997 Hub4 English Evaluation," Proceedings of the Speech Recognition Workshop (1998).

S. Dharanipragada et al., "A Fast Vocabulary Independent Algorithm for Spotting Words in Speech," Proc. ICASSP98, Seattle, WA (1998).

J. Navratil et al., An Efficient Phonotactic-Acoustic system for Language Identification, Proc. ICASSP98, Seattle, WA (1998).

G. N. Ramaswamy et al., "Compression of Acoustic Features for Speech Recognition in Network Environments," Proc. ICASSP98, Seattle, WA (1998).

S. Chen et al., "Recent Improvements to IBM's Speech Recognition System for Automatic Transcription of Broadcast News," Proceedings of the Speech Recognition Workshop (1999).

S. Dharanipragada et al., "Story Segmentation and Topic Detection in the Broadcast News Domain," Proceedings of the Speech Recognition Workshop (1999).

C. Neti et al., "Audio-Visual Speaker Recognition for Video Broadcast News," Proceedings of the Speech Recognition Workshop (1999).

Foote et al., "Finding Presentations in Recorded Meetings Using Audio and Video Features," Proceedings of IEEE International Conference on Acoustics, Speech and Signal Processing, vol. 6, pgs. pp. 3029-3032 (Mar. 15, 1999).

Nakagawa et al., "Segmentation of Continuous Speech by HMM and Bayesian Probability," Transactions of the Institute of Electronics, Information and Communication Engineers, D-II, vol. J72 D-II, No. 1, pp. 1-10 (Jan. 1989).

Wilcox et al., "Segmentation of Speech Using Speaker Identification," Proceedings of IEEE International Conference on Acoustics, Speech and Signal Processing, vol. 1, pp. 1-161-1-164 (Apr. 19, 1994).

Ozawa Kazunori, "Voice Signal Encoding and Decoding Method, Voice Signal Encoder and Voice Signal Decoder," Patent Abstracts of Japan, Publication No. 01-257999 (Oct. 16, 1989).

Hanada Eisuke, "Vice Encoding System," Patent Abstracts of Japan, Publication No. 03-198099 (Aug. 29, 1991).

Eberman et al., "Signal Segmentalization Method Basing Cluster Constitution," Patent Abstracts of Japan, Publication No. 10-105187 (Apr. 24, 1998).

Patent Abstracts of Japan, Publication No. 59-111699 (Jun. 27, 1984).

* cited by examiner

METHODS AND APPARATUS FOR TRACKING SPEAKERS IN AN AUDIO STREAM

FIELD OF THE INVENTION

The present invention relates generally to audio information classification systems and, more particularly, to methods and apparatus for identifying speakers in an audio file.

BACKGROUND OF THE INVENTION

Many organizations, such as broadcast news organizations and information retrieval services, must process large amounts of audio information, for storage and retrieval purposes. Frequently, the audio information must be classified by subject or speaker name, or both. In order to classify audio information by subject, a speech recognition system initially transcribes the audio information into text for automated classification or indexing. Thereafter, the index can be used to perform query-document matching to return relevant documents to the user.

Thus, the process of classifying audio information by subject has essentially become fully automated. The process of classifying audio information by speaker, however, often remains a labor intensive task, especially for real-time applications, such as broadcast news. While a number of computationally-intensive off-line techniques have been proposed for automatically identifying a speaker from an audio source using speaker enrollment information, the speaker classification process is most often performed by a human operator who identifies each speaker change, and provides a corresponding speaker identification.

The segmentation of audio files is also useful as a preprocessing step for a speaker identification tool that actually provides a speaker name for each identified segment. In addition, the segmentation of audio files may be used as a preprocessing step to reduce background noise or music.

As apparent from the above-described deficiencies with conventional techniques for classifying an audio source by speaker, a need exists for a method and apparatus that automatically classifies speakers in real-time from an audio source. A further need exists for a method and apparatus that provides improved speaker segmentation and clustering based on the Bayesian Information Criterion (BIC).

SUMMARY OF THE INVENTION

Generally, a method and apparatus are disclosed for automatically identifying speakers from an audio (or video) source. The audio information is processed to identify potential segment boundaries, corresponding to a speaker change. Thereafter, homogeneous segments (generally corresponding to the same speaker) are clustered, and a cluster identifier is assigned to each detected segment. Thus, segments corresponding to the same speaker should have the same cluster identifier. A clustering output file is generated that provides a sequence of segment numbers and a corresponding cluster number. A speaker identification engine or a human may then optionally assign a speaker name to each cluster.

The present invention concurrently segments an audio file and clusters the segments corresponding to the same speaker. A segmentation subroutine is utilized to identify all possible frames where there is a segment boundary, corresponding to a speaker change. A frame represents speech characteristics over a given period of time. The segmentation subroutine determines whether or not there is a segment boundary at a given frame, i, using a model selection criterion that compares two models. A first model assumes that there is no segment boundary within a window of samples, $(x_1, \ldots x_n)$, using a single full-covariance Gaussian. A second model assumes that there is a segment boundary within a window of samples, $(x_1, \ldots x_n)$, using two full-covariance Gaussians, with $(x_1, \ldots x_i)$ drawn from the first Gaussian, and $(x_{i+1}, \ldots x_n)$ drawn from the second Gaussian. The $i^{th}$ frame is a good candidate for a segment boundary if the expression:

$$\Delta BIC_i = -\frac{n}{2}\log|\Sigma_w| + \frac{i}{2}\log|\Sigma_f| + \frac{n-i}{2}\log|\Sigma_s| + \frac{1}{2}\lambda\left(d + \frac{d(d+1)}{2}\right)\log n$$

is negative, where $|\Sigma_w|$ is the determinant of the covariance of the whole window (i.e., all n frames), $|\Sigma_f|$ is the determinant of the covariance of the first subdivision of the window, and $|\Sigma_s|$ is the determinant of the covariance of the second subdivision of the window.

According to a further aspect of the invention, a new window selection scheme is presented that improves the overall accuracy of segmentation processing, especially on small segments. If the selected window contains too many vectors, some boundaries are likely to be missed. Likewise, if the selected window is too small, lack of information will result in poor representation of the data. The improved segmentation subroutine of the present invention considers a relatively small amount of data in areas where new boundaries are very likely to occur, and increases the window size when boundaries are not very likely to occur. The window size increases in a slow manner when the window is small, and increases in a faster manner when the window gets bigger. When a segment boundary is found in a window, the next window begins after the detected boundary, using the minimal window size $(N_0)$.

In addition, the present invention improves the overall processing time by better selection of the locations where BIC tests are performed. BIC tests can be eliminated when they correspond to locations where the detection of a boundary is very unlikely. First, the BIC tests are not performed at the borders of each window, since they necessarily represent one Gaussian with very little data (this apparently small gain is repeated over segment detections and actually has no negligible performance impact). In addition, when the current window is large, if all the BIC tests are performed, the BIC computations at the beginning of the window will have been done several times, with some new information added each time. Thus, the number of BIC computations can be decreased by ignoring BIC computations in the beginning of the current window.

According to another aspect of the invention, a clustering subroutine clusters homogeneous segments that were identified by the segmentation subroutine. Generally, the clustering subroutine uses a model selection criterion to assign a cluster identifier to each of the identified segments. The segments corresponding to the same speaker should have the same cluster identifier. To determine whether to merge two clusters, $C_i$ and $C_j$, two models are utilized. The first model assumes that the clusters should be merged and provides a value $BIC_1$. The second model assumes that two separate clusters should be maintained and provides a value $BIC_2$. If the difference of BIC values ($\Delta BIC = BIC_1 - BIC_2$) is positive, the two clusters are merged.

The online clustering technique of the present invention involves the K clusters found in the previous iterations (or calls to the clustering procedure) and the new M segments to cluster. For each unclustered segment, the clustering subroutine calculates the difference in BIC values relative to all of the other M−1 unclustered segments. In addition, for each unclustered segment, the clustering subroutine also calculates the difference in BIC values relative to the K existing clusters. The largest difference in BIC values, $\Delta BIC_{max}$, is identified among the M(M+K−1) results. If the largest difference in BIC values, $\Delta BIC_{max}$, is positive, then the current segment is merged with the cluster or other unclustered segment providing the largest difference in BIC values, $\Delta BIC_{max}$. If, however, the largest difference in BIC values, $\Delta BIC_{max}$, is not positive, then the current segments are identified as one or more new clusters.

A more complete understanding of the present invention, as well as further features and advantages of the present invention, will be obtained by reference to the following detailed description and drawings.

DETAILED DESCRIPTION OF PREFERRED EMBODIMENTS

Figure 1:
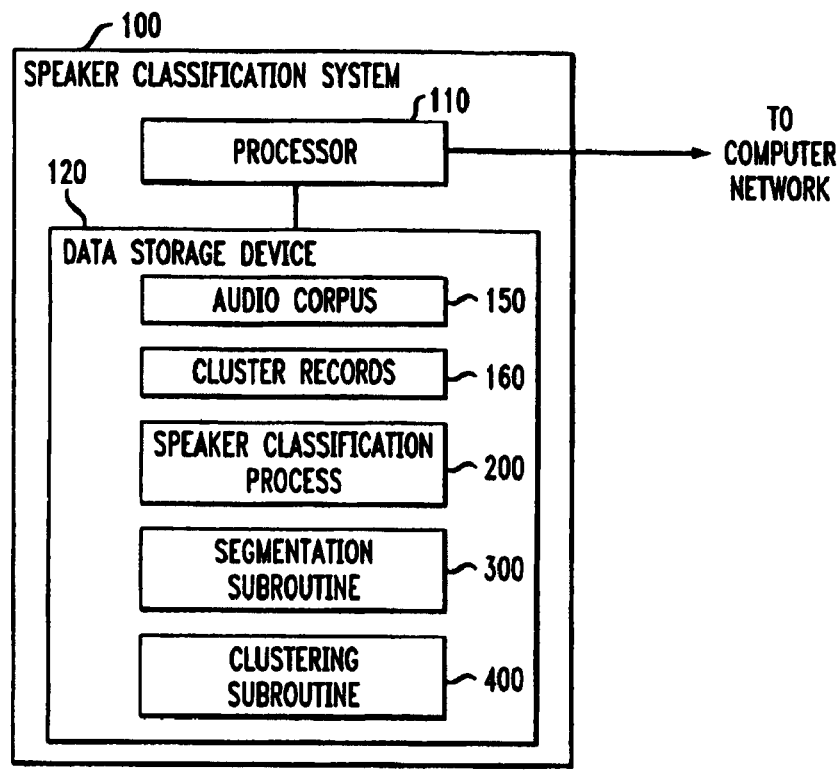
FIG. 1 is a block diagram of a speaker classification system according to the present invention.

FIG. 1 illustrates a speaker classification system 100 in accordance with the present invention that automatically identifies speakers from an audio-video source. The audio-video source file may be, for example, an audio recording or live feed of a broadcast news program. The audio-video source is initially processed to identify all possible frames where there is a segment boundary, indicating a speaker change. Thereafter, homogeneous segments (corresponding to the same speaker) are clustered, and a cluster identifier is assigned to each of the identified segments. Thus, all of the segments corresponding to the same speaker should have the same cluster identifier. The speaker classification system 100 produces a clustering output file that provides a sequence of segment numbers (with the start and end times of each segment) along with the corresponding identified cluster number.

A speaker identification engine or a human may then optionally assign a speaker name to each cluster. The optional speaker identification engine uses a pre-enrolled pool of speakers for identification. Since the speaker identification task is an optional component of the speaker classification system 100, the present invention does not require training data for each of the speakers.

FIG. 1 is a block diagram showing the architecture of an illustrative speaker classification system 100 in accordance with the present invention. The speaker classification system 100 may be embodied as a general purpose computing system, such as the general purpose computing system shown in FIG. 1. The speaker classification system 100 includes a processor 110 and related memory, such as a data storage device 120, which may be distributed or local. The processor 110 may be embodied as a single processor, or a number of local or distributed processors operating in parallel. The data storage device 120 and/or a read only memory (ROM) are operable to store one or more instructions, which the processor 110 is operable to retrieve, interpret and execute.

The data storage device 120 preferably includes an audio corpus database 150 for storing one or more prerecorded or live audio or video files (or both) that can be classified in real-time in accordance with the present invention. The data storage device 120 also includes one or more cluster output files 160, discussed below. In addition, as discussed further below in conjunction with FIGS. 2 through 4, the data storage device 120 includes a speaker classification process 200, a segmentation subroutine 300 and a clustering subroutine 400. The speaker classification process 200 analyzes one or more audio files in the audio corpus database 150 and produces the clustering output file 160, providing a sequence of segment numbers (with the start and end times of each segment) along with the corresponding identified cluster number.

Bayesian Information Criterion (BIC) Background

The segmentation subroutine 300 and clustering subroutine 400 are both based on the Bayesian Information Criterion (BIC) model-selection criterion. BIC is an asymptotically optimal Bayesian model-selection criterion used to decide which of p parametric models best represents n data samples $x_1, \ldots, x_n$, $x_i \in R^d$. Each model $M_j$ has a number of parameters, $k_j$. The samples $x_i$ are assumed to be independent.

For a detailed discussion of the BIC theory, see, for example, G. Schwarz, "Estimating the Dimension of a Model," The Annals of Statistics, Vol. 6, 461-464 (1978), incorporated by reference herein. According to the BIC theory, for sufficiently large n, the best model of the data is the one which maximizes $$BIC_j = \log L_j(x_1, \ldots, x_n) - \frac{1}{2}\lambda k_j \log n \qquad \text{Eq. (1)}$$

where $\lambda=1$, and where $L_j$ is the maximum likelihood of the data under model $M_j$ (in other words, the likelihood of the data with maximum likelihood values for the $k_j$ parameters of $M_j$). When there are only two models, a simple test is used for model selection. Specifically, the model $M_1$ is selected over the model $M_2$ if $\Delta BIC = BIC_1 - BIC_2$, is positive. Likewise, the model $M_2$ is selected over the model $M_1$ if $\Delta BIC = BIC_1 - BIC_2$, is negative.

Speaker Classification Processes

Figure 2:
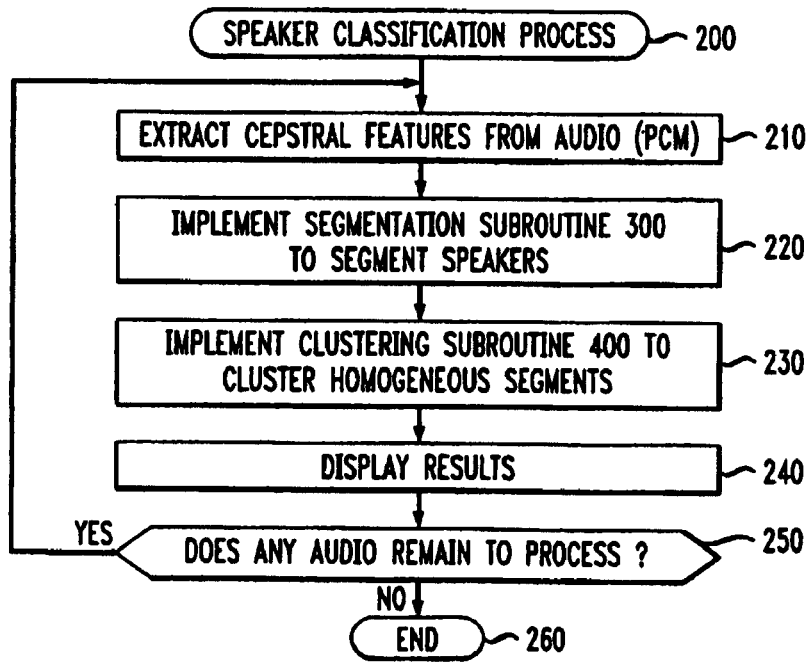
FIG. 2 is a flow chart describing an exemplary speaker classification process, performed by the speaker classification system of FIG. 1.
Figure 3:
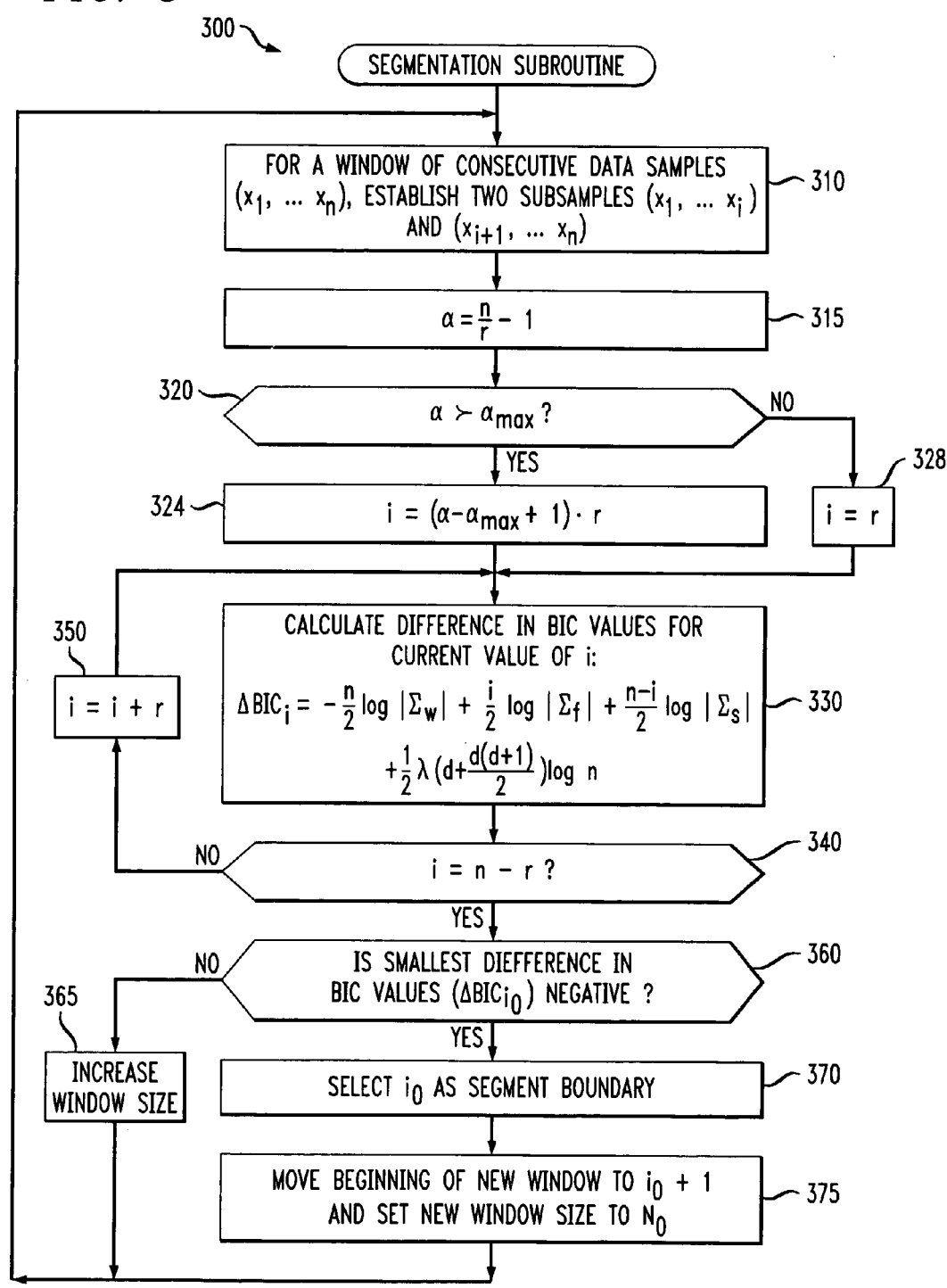
FIG. 3 is a flow chart describing an exemplary segmentation subroutine performed by the speaker classification system of FIG. 1.

As previously indicated, the speaker classification system 100 executes a speaker classification process 200, shown in FIG. 2, to analyze one or more audio files in the audio corpus database 150 and produce the cluster output file 160. The cluster output file 160 provides a sequence of segment numbers (with the start and end times of each segment) along with the corresponding identified cluster number.

As shown in FIG. 2, the speaker classification system 100 initially extracts the cepstral features from the PCM audio input file or a live audio stream during step 210. In the illustrative embodiment, the data samples (or frames) are standard 24-dimensional (d=24) mel-cepstral feature vectors generated at 10 ms intervals from the continuous audio stream form. Generally, the feature vectors represent the speech with as little loss of information as possible Thereafter, the speaker classification process 200 implements the segmentation subroutine 300, discussed further below in conjunction with FIG. 3, during step 220 to separate the speakers. Generally, the segmentation subroutine 300 attempts to identify all possible frames where there is a segment boundary.

The speaker classification process 200 implements the clustering subroutine 400, discussed further below in conjunction with FIG. 4, during step 230 to cluster the homogeneous segments (corresponding to the same speaker) that were identified by the segmentation subroutine 300. Generally, the clustering subroutine 400 assigns a cluster identifier to each of the detected segments. All of the segments corresponding to the same speaker should have the same cluster identifier.

Finally, the results of the classification system 100 are displayed during step 240. Generally, the results are the cluster output file 160 that provides a sequence of segment numbers (with the start and end times of each segment) along with the corresponding identified cluster number. A test is then performed during step 250 to determine if any audio remains to be processed. If it is determined during step 250 that some audio does remain to be processed, then program control to step 210 and continues processing in the manner described above. If, however, it is determined during step 250 that there is no audio remaining to be processed, then program control terminates during step 260.

Speaker Segmentation

As previously indicated, the speaker classification process 200 implements the segmentation subroutine 300 (FIG. 3) during step 220 to identify all possible frames where there is a segment boundary. Without loss of generality, consider a window of consecutive data samples $(x_1, \ldots, x_n)$ in which there is at most one segment boundary.

The basic question of whether or not there is a segment boundary at frame i can be cast as a model selection problem between the following two models: model $M_1$, where $(x_1, \ldots, x_n)$ is drawn from a single full-covariance Gaussian, and model $M_2$, where $(x_1, \ldots, x_n)$ is drawn from two full-covariance Gaussians, with $(x_1, \ldots, x_i)$ drawn from the first Gaussian, and $(x_{i+1}, \ldots, x_n)$ drawn from the second Gaussian.

$$k_1 = d + \frac{d(d+1)}{2}$$

Since $\chi_i \in R^d$, model $M_1$ has parameters, while model $M_2$ has twice as many parameters ($k_2 = 2k_1$). It can be shown that the $i^{th}$ frame is a good candidate for a segment boundary if the expression:

$$\Delta BIC_i = -\frac{n}{2}\log|\Sigma_w| + \frac{i}{2}\log|\Sigma_f| + \frac{n-i}{2}\log|\Sigma_s| + \frac{1}{2}\lambda\left(d + \frac{d(d+1)}{2}\right)\log n$$

is negative, where $|\Sigma_w|$ is the determinant of the covariance of the whole window (i.e., all n frames), $|\Sigma_f|$ is the determinant of the covariance of the first subdivision of the window, and $|\Sigma_s|$ is the determinant of the covariance of the second subdivision of the window.

Thus, two subsamples, $(x_1, \ldots, x_i)$ and $(x_{i+1}, \ldots, x_n)$, are established during step 310 from the window of consecutive data samples $(x_1, \ldots, x_n)$. As discussed below in a section entitled Improving Efficiency of BIC Tests, a number of tests are performed during steps 315 through 328 to eliminate some BIC tests in the window, when they correspond to locations where the detection of a boundary is very unlikely. Specifically, the value of α variable α is initialized during step 315 to α value of n/r−1, where r is the detection resolution (in frames). Thereafter, a test is performed during step 320 to determine if the value α exceeds a maximum value, $\alpha_{max}$. If it is determined during step 320 that the value α exceeds a maximum value, $\alpha_{max}$, then the counter i is set to a value of $(\alpha - \alpha_{max}+1)r$ during step 324. If, however, it is determined during step 320 that the value a does not exceed a maximum value, $\alpha_{max}$, then the counter i is set to a value of r during step 328. Thereafter, the difference in BIC values is calculated during step 330 using the equation set forth above.

A test is performed during step 340 to determine if the value of i equals n−r. In other words, have all possible samples in the window been evaluated. If it is determined during step 340 that the value of i does not yet equal n−r, then the value of i is incremented by r during step 350 to continue processing for the next sample in the window at step 330. If, however, it is determined during step 340 that the value of i equals n−r, then a further test is performed during step 360 to determine if the smallest difference in BIC values ($\Delta BIC_{i0}$) is negative. If it is determined during step 360 that the smallest difference in BIC values is not negative, then the window size is increased during step 365 before returning to step 310 to consider a new window in the manner described above. Thus, the window size, n, is only increased when the ΔBIC values for all i in one window have been computed and none of them leads to a negative ΔBIC value.

If, however, it is determined during step 360 that the smallest difference in BIC values is negative, then $i_0$ is selected as a segment boundary during step 370. Thereafter, the beginning of the new window is moved to $i_0+1$ and the window size is set to $N_0$ during step 375, before program control returns to step 310 to consider the new window in the manner described above.

Thus, the BIC difference test is applied for all possible values of i, and $i_0$ is selected with the most negative $\Delta BIC_i$. A segment boundary can be detected in the window at frame i: if $\Delta BIC_{i0} < 0$, then $x_{i0}$ corresponds to a segment boundary. If the test fails then more data samples are added to the current window (by increasing the parameter n) during step 360, in a manner described below, and the process is repeated with this new window of data samples until all the feature vectors have been segmented. Generally, the window size is extended by a number of feature vectors, which itself increases from one window extension to another. However, a window is never extended by a number of feature vectors larger than some maximum value. When a segment boundary is found during step 370, the window extension value retrieves its minimal value ($N_0$).

In accordance with the present invention, the segmentation subroutine 300 is followed by the clustering subroutine 400. Thus, missing segments is a more severe error than introducing spurious segments since clustering can take care of eliminating spurious segment boundaries from the segmentation subroutine 300. Indeed, even without clustering, in applications like speaker identification, spurious boundaries (assuming no speaker identification errors) lead to consecutive segments being labeled the same, which is tolerable. Missed boundaries, on the other hand, leads to two problems. First, one of the speakers cannot be identified. In addition, the other speaker will also be poorly identified since that speaker's audio data is corrupted by data from the missed speaker.

Variable Window Scheme

According to a further feature of the present invention, a new window selection scheme is presented that improves the overall accuracy, especially on small segments. The choice of the window size on which the segmentation subroutine 300 is performed is very important. If the selected window contains too many vectors, some boundaries are likely to be missed. If, on the other hand, the selected window is too small, lack of information will result in poor representation of the data by the Gaussians.

It has been suggested to add a fixed amount of data to the current window if no segment boundary has been found. Such a scheme does not take advantage of the 'contextual' information to improve the accuracy: the same amount of data is added, whether or not a segment boundary has just been found, or no boundary has been found for a long time.

The improved segmentation subroutine of the present invention considers a relatively small amount of data in areas where new boundaries are very likely to occur, and increases the window size more generously when boundaries are not very likely to occur. Initially, a window of vectors of a small size is considered (typically 100 frames of speech). If no segment boundary is found on the current window, the size of the window is increased by $\Delta N_i$ frames. If no boundary is found in this new window, the number of frames is increased by $\Delta N_{i+1}$, with $\Delta N_i = \Delta N_{i+1} + \delta_i$, where $\delta_i = 2\delta_{i+1}$ until a segment boundary is found or the window extension has reached a maximum size (in order to avoid accuracy problems if a boundary occurs). This ensures an increasing window size which is pretty slow when the window is still small, and is faster when the window gets bigger. When a segment boundary is found in a window, the next window begins after the detected boundary, using the minimal window size ($N_0$).

Improving Efficiency of BIC Tests

According to another feature of the present invention, improvements in the overall processing time are obtained by better selection of the locations where BIC tests are performed. Some of the BIC tests in the window can be arbitrarily eliminated, when they correspond to locations where the detection of a boundary is very unlikely. First, the BIC tests are not performed at the borders of each window, since they necessarily represent one Gaussian with very little data (this apparently small gain is repeated over segment detections and actually has no negligible performance impact).

In addition, when the current window is large, if all the BIC tests are performed, the BIC computations at the beginning of the window will have been done several times, with some new information added each time. If no segment boundary has been found in the first 5 seconds, for example, in a window size of 10 seconds, it is quite unlikely that a boundary will be hypothesized in the first 5 seconds with an extension of the current 10 second window. Thus, the number of BIC computations can be decreased by ignoring BIC computations in the beginning of the current window (following a window extension). In fact, the maximum number of BIC computations is now an adjustable parameter, tweaked according to the speed/accuracy level required ($\alpha_{max}$ in FIG. 3).

Thus, the segmentation subroutine 300 permits knowledge of the maximum time it takes before having some feedback on the segmentation information. Because even if no segment boundary has been found yet, if the window is big enough one knows that there is no segment present in the first frames. This information can be used to do other processing on this part of the speech signal.

BIC Penalty Weight

The BIC formula utilizes a penalty weight parameter, $\lambda$, in order to compensate for the differences between the theory and the practical application of the criterion. It has been found that the best value of $\lambda$ that gives a good tradeoff between miss rate and false-alarm rate is 1.3. For a more comprehensive study of the effect of $\lambda$ on the segmentation accuracy for the transcription of broadcast news, see, A. Tritschler, "A Segmentation-Enabled Speech Recognition Application Using the BIC," M. S. Thesis, Institut Eurecom (France, 1998), incorporated by reference herein.

While in principle the factor $\lambda$ is task-dependent and has to be returned for every new task, in practice the algorithm has been applied to different types of data and there is no appreciable change in performance by using the same value of $\lambda$.

Speaker Clustering

BIC Processing for Clustering The clustering subroutine 400 attempts to merge one of a set of clusters $C_1, \ldots, C_K$, with another cluster, leading to a new set of clusters $C_1', \ldots, C_{K-1}'$, where one of the new clusters is the merge between two previous clusters. To determine whether to merge two clusters, $C_i$ and $C_j$, two models are built: the first model, $M_1$, is a Gaussian model computed with the data of $C_i$ and $C_j$ merged which leads to $BIC_1$. The second model, $M_2$, keeps two different Gaussians, one for $C_i$ and one for $C_j$, and gives $BIC_2$. Thus, it is better to keep two distinct models if $\Delta BIC = BIC_1 - BIC_2 < 0$. If this difference of BIC is positive, the two clusters are merged and we have the desired new set of clusters.

S. Chen and P. Gopalakrishnan, "Speaker, Environment and Channel Change Detection and Clustering Via the Bayesian Information Criterion," Proceedings of the DARPA Workshop, 1998, incorporated by reference herein, shows how to implement off-line clustering in a bottom-up fashion, i.e., starting with all the initial segments, and building a tree of clusters by merging the closest nodes of the tree (the measure of similarity being the BIC). The clustering subroutine 400 implements a new online technique.

As discussed below in conjunction with FIG. 4, the online clustering of the present invention involves first the K clusters found in the previous iterations (or calls to the clustering procedure 400), and the new M segments to cluster.

Clustering Subroutine

As previously indicated, the speaker classification process 200 implements the clustering subroutine 400 (FIG. 4) during step 230 to cluster homogenous segments that were identified by the segmentation subroutine 300. The identified segments are clustered with another identified segment or a cluster identified during a previous iteration of the clustering subroutine 400.

Figure 4:
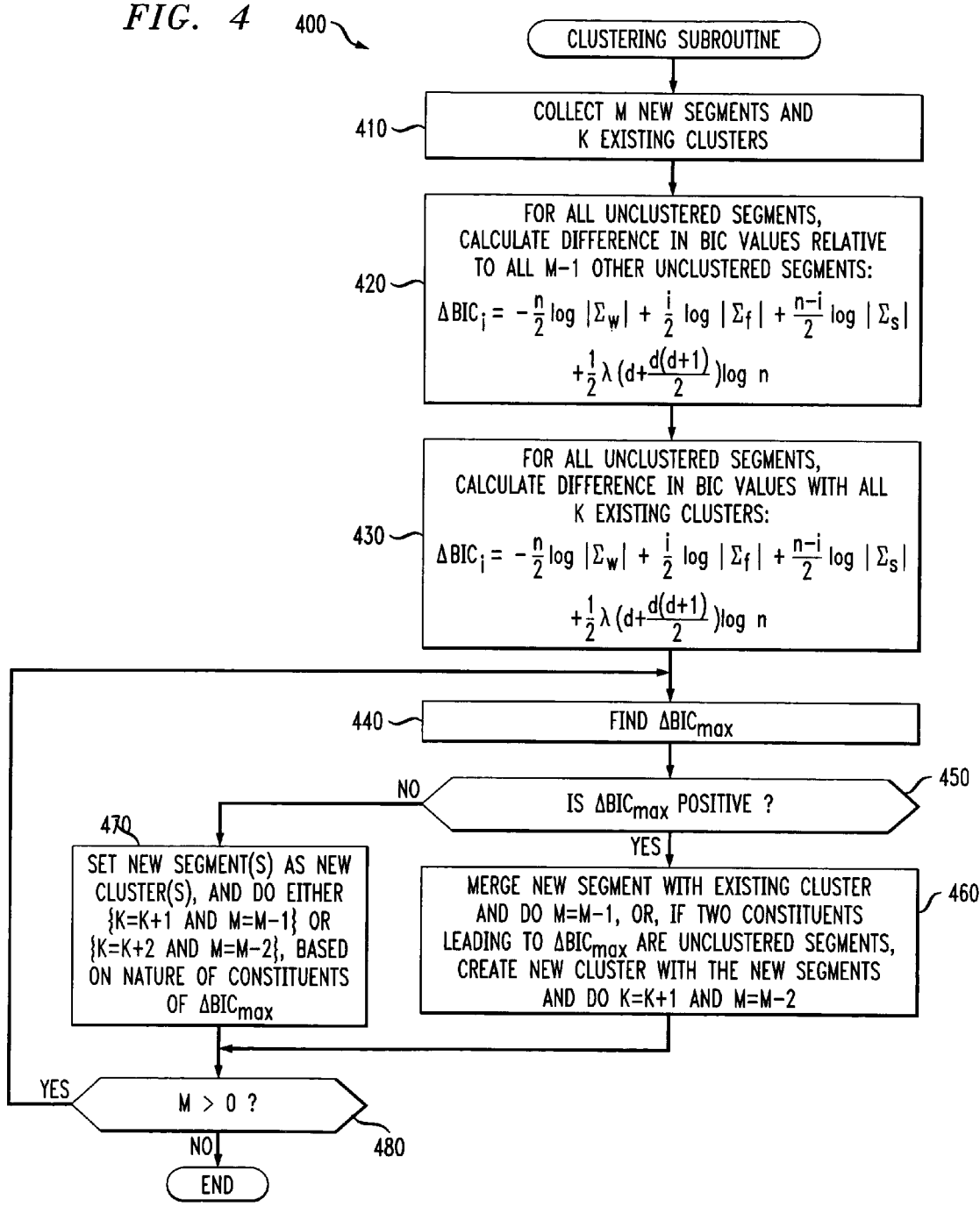
FIG. 4 is a flow chart describing an exemplary clustering subroutine performed by the speaker classification system of FIG. 1.

As shown in FIG. 4, the clustering subroutine 400 initially collects the M new segments to be clustered and the K existing clusters during step 410. For all unclustered segments, the clustering subroutine 400 calculates the difference in BIC values relative to all of the other M−1 unclustered segments during step 420, as follows:

$$\Delta BIC_i = -\frac{n}{2}\log|\Sigma_w| + \frac{i}{2}\log|\Sigma_f| + \frac{n-i}{2}\log|\Sigma_s| + \frac{1}{2}\lambda\left(d + \frac{d(d+1)}{2}\right)\log n$$

In addition, for all unclustered segments, the clustering subroutine 400 also calculates the difference in BIC values relative to the K existing clusters during step 430, as follows:

$$\Delta BIC_i = -\frac{n}{2}\log|\Sigma_w| + \frac{i}{2}\log|\Sigma_f| + \frac{n-i}{2}\log|\Sigma_s| + \frac{1}{2}\lambda\left(d + \frac{d(d+1)}{2}\right)\log n$$

Thereafter, the clustering subroutine 400 identifies the largest difference in BIC values, $\Delta BIC_{max}$, among the M(M+K−1) results during step 440. A test is then performed during step 450 to determine if the largest difference in BIC values, $\Delta BIC_{max}$, is positive. As discussed further below, the $\Delta BIC_{max}$ value is the largest difference of BICs among all possible combinations of existing clusters and new segments to be clustered. It is not only the largest difference given the current new segment, which would take each segment in series and attempt to merge the segment with a cluster or create a new cluster, but rather the clustering subroutine 400 implements an optimal approach given all the new segments.

If it is determined during step 450 that the largest difference in BIC values, $\Delta BIC_{max}$, is positive, then the current segment is merged with the existing cluster and the value of M is incremented, or the new segment is merged with another unclustered segment and the value of K is incremented, and the value of M is decremented by two, during step 460. Thus, the counters are updated based on whether there are two segments and a new cluster has to be created (M=M−2 and K=K+1), because the two segments correspond to the same cluster, or if one of the entities is already a cluster, then the new segment is merged into the cluster (M=M−1 and K is constant). Thereafter, program control proceeds to step 480, discussed below.

If, however, it is determined during step 450 that the largest difference in BIC values, $\Delta BIC_{max}$, is not positive, then the current segment is identified as a new cluster, and either (i) the value of the cluster counter, K, is incremented and the value of the segment counter, M, is decremented, or (ii) the value of the cluster counter, K, is incremented by two and the value of the segment counter, M, is decremented by two, during step 470, based on the nature of the constituents of $\Delta BIC_{max}$. Thus, the counters are updated based on whether there is one segment and one existing cluster (M=M−1 and K=K+1) or two new segments (M=M−2 and K=K+2).

Thereafter, a test is performed during step 480 to determine if the value of the segment counter, M, is strictly positive, indicating that additional segments remain to be processed. If it is determined during step 480 that the value of the segment counter, M, is positive, then program control returns to step 440 to continue processing the additional segment(s) in the manner described above. If, however, it is determined during step 480 that the value of the segment counter, M, is zero, then program control terminates.

The clustering subroutine 400 is a suboptimal algorithm in comparison to the offline bottom-up clustering technique discussed above, since the maxima considered for the $\Delta BIC$ values can be local in the offline scheme, as opposed to the global maxima found in the online version. Since the optimal segment merges are usually those corresponding to segments close in time, the online clustering subroutine 400 makes it easier to associate such segments to the same cluster. In order to reduce the influence of the non-reliable small segments to cluster, only the segments with sufficient data are clustered; the other segments are gathered in a separate 'garbage' cluster. Indeed, the small segments can lead to errors in clustering, due to the fact that the Gaussians could be poorly represented. Therefore, in order to improve the classification accuracy, the small segments are all given a cluster identifier of zero, which means that no other clustering decision can be taken.

APPLICATION

The speaker classification system 100 can be used for real-time transcription, for example, of broadcast news. The transcription engine may be embodied, for example, as the ViaVoice™ speech recognition system, commercially available from IBM Corporation of Armonk, N.Y. The speaker classification system 100 returns segment/cluster information with a confidence score. The resulting segments and clusters can be provided to a speaker identification engine, or a human, for indentification and verification. The speaker identification engine uses a pre-enrolled pool of speakers for identification. The audio and segment/cluster information from the speaker classification system 100 are used to identify the speakers in each segment from the pre-enrolled pool. For a discussion of some standard techniques used for speaker identification, see, for example, H. Beigi et al., "IBM Model-Based and Frame-By-Frame Speaker Recognition," Proc. Speaker Recognition and Its Commercial and Forensic Applications (1998), incorporated by reference herein.

It is to be understood that the embodiments and variations shown and described herein are merely illustrative of the principles of this invention and that various modifications may be implemented by those skilled in the art without departing from the scope and spirit of the invention.

What is claimed is:

1. A method for tracking a speaker in an audio source, said method comprising the steps of:
   identifying, by using one or more processors of a computer system potential segment boundaries in said audio source; and
   clustering, by using one or more processors of said computer system homogeneous segments from said audio source substantially concurrently with said identifying step.

2. The method of claim 1, wherein said identifying step identifies segment boundaries using a BIC model-selection criterion.

3. The method of claim 2, wherein a first model assumes there is no boundary in a portion of said audio source and a second model assumes there is a boundary in said portion of said audio source.

4. The method of claim 2, wherein a given sample, i, in said audio source is likely to be segment boundary if the following expression is negative:

$$\Delta BIC_i = -\frac{n}{2}\log|\Sigma_w| + \frac{i}{2}\log|\Sigma_f| + \frac{n-i}{2}\log|\Sigma_s| + \frac{1}{2}\lambda\left(d + \frac{d(d+1)}{2}\right)\log n$$

where $|\Sigma_w|$ is the determinant of the covariance of the window of all n samples, $|\Sigma_f|$ is the determinant of the covariance of the first subdivision of the window, and $|\Sigma_s|$ is the determinant of the covariance of the second subdivision of the window.

5. The method of claim 2, wherein said BIC model selection test is not performed at the border of each window of samples.

6. The method of claim 2, wherein said BIC model selection test is not performed when the window size, n, exceeds a predefined threshold.

7. The method of claim 1, wherein said identifying step considers a smaller window size, n, of samples in areas where a segment boundary is unlikely to occur.

8. The method of claim 7, wherein said window size, n, is increased in a relatively slow manner when the window size is small and increases in a faster manner when the window size is larger.

9. The method of claim 7, wherein said window size, n, is initialized to a minimum value after a segment boundary is detected.

10. The method of claim 1, wherein said clustering step is performed using a BIC model-selection criterion.

11. The method of claim 10, wherein a first model assumes that two segments or clusters should be merged, and a second model assumes that said two segments or clusters should be maintained independently.

12. The method of claim 11, further comprising the step of merging said two clusters if a difference in BIC values for each of said models is positive.

13. The method of claim 1, wherein said clustering step is performed using K previously identified clusters and M segments to be clustered.

14. The method of claim 1, further comprising the step of assigning a cluster identifier to each of said clusters.

15. The method of claim 1, further comprising the step of processing said audio source with a speaker identification engine to assign a speaker name to each of said clusters.

16. A method for tracking a speaker in an audio source, said method comprising the steps of:
   identifying, by using one or more processors of a computer system potential segment boundaries in said audio source; and
   clustering, by using one or more processors of said computer system segments from said audio source corresponding to the same speaker substantially concurrently with said identifying step.

17. The method of claim 16, wherein said identifying step identifies segment boundaries using a BIC model-selection criterion.

18. The method of claim 17, wherein a first model assumes there is no boundary in a portion of said audio source and a second model assumes there is a boundary in said portion of said audio source.

19. The method of claim 17, wherein said BIC model selection test is not performed where the detection of a boundary is unlikely to occur.

20. The method of claim 16, wherein said identifying step considers a smaller window size, n, of samples in areas where a segment boundary is unlikely to occur.

21. The method of claim 16, wherein said clustering step is performed using a BIC model-selection criterion, where a first model assumes that two segments or clusters should be merged, and a second model assumes that said two segments or clusters should be maintained independently.

22. The method of claim 16, wherein said clustering step is performed using K previously identified clusters and M segments to be clustered.

23. A method for tracking a speaker in an audio source, said method comprising the steps of:
   identifying, by using one or more processors of a computer system potential segment boundaries during a pass through said audio source; and
   clustering, by using one or more processors of said computer system segments from said audio source corresponding to the same speaker during said same pass through said audio source.

24. The method of claim 23, wherein said identifying step identifies segment boundaries using a BIC model-selection criterion.

25. The method of claim 24, wherein a first model assumes there is no boundary in a portion of said audio source and a second model assumes there is a boundary in said portion of said audio source.

26. The method of claim 24, wherein said BIC model selection test is not performed where the detection of a boundary is unlikely to occur.

27. The method of claim 23, wherein said identifying step considers a smaller window size, n, of samples in areas where a segment boundary is unlikely to occur.

28. The method of claim 23, wherein said clustering step is performed using a BIC model-selection criterion, where a first model assumes that two segments or clusters should be merged, and a second model assumes that said two segments or clusters should be maintained independently.

29. The method of claim 23, wherein said clustering step is performed using K previously identified clusters and M segments to be clustered.

30. A system for tracking a speaker in an audio source, comprising:
   a memory that stores computer-readable code; and
   a processor operatively coupled to said memory, said processor configured to implement said computer-readable code, said computer-readable code configured to:
   identify potential segment boundaries in said audio source; and
   cluster homogeneous segments from said audio source substantially concurrently with said identification of segment boundaries.

31. A computer program product embodied in a computer readable storage medium having computer readable program code, comprising:
   a computer readable progam code to identify potential segment boundaries in an audio source; and
   a computer readable program code to cluster homogeneous segments from said audio source substantially concurrently with said identification of segment boundaries.

32. A system for tracking a speaker in an audio source, comprising:
   a memory that stores computer-readable code; and
   a processor operatively coupled to said memory, said processor configured to implement said computer-readable code, said computer-readable code configured to:
   identify potential segment boundaries in said audio source; and
   cluster segments from said audio source corresponding to the same speaker substantially concurrently with said identification of segment boundaries.

33. A computer program product embodied in a computer readable storage medium having computer readable program code, comprising:
   a computer readable program code to identify potential segment boundaries in an audio source; and
   a computer readable program code to cluster segments from said audio source corresponding to the same speaker substantially concurrently with said identification of segment boundaries.

34. A system for tracking a speaker in an audio source, comprising:
   a memory that stores computer-readable code; and
   a processor operatively coupled to said memory, said processor configured to implement said computer-readable code, said computer-readable code configured to:
   identify potential segment boundaries during a pass through said audio source; and
   cluster segments from said audio source corresponding to the same speaker during said same pass through said audio source.

35. A computer program product embodied in a computer readable storage medium having computer readable program code, comprising:
   a computer readable program code to identify potential segment boundaries during a pass through an audio source; and
   a computer readable program code to cluster segments from said audio source corresponding to the same speaker during said same pass through said audio source.

* * * * *